United States Patent
Kida et al.

(10) Patent No.: US 8,961,370 B2
(45) Date of Patent: Feb. 24, 2015

(54) VEHICLE CONTROL APPARATUS

(75) Inventors: Akihiro Kida, Toyota (JP); Michihito Shimada, Toyota (JP); Masashi Takagi, Nagoya (JP); Hiroshi Shimada, Tajimi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 178 days.

(21) Appl. No.: 13/493,233

(22) Filed: Jun. 11, 2012

(65) Prior Publication Data

US 2012/0322619 A1 Dec. 20, 2012

(30) Foreign Application Priority Data

Jun. 17, 2011 (JP) ................. 2011-135395

(51) Int. Cl.
*B60W 10/06* (2006.01)
*B60K 28/16* (2006.01)

(52) U.S. Cl.
USPC ............................. 477/185; 477/207; 701/84

(58) Field of Classification Search
USPC ......... 477/183, 184, 185, 203, 205, 207, 906, 477/907; 701/84, 91
See application file for complete search history.

(56) References Cited

U.S. PATENT DOCUMENTS

| | | | |
|---|---|---|---|
| 4,791,900 A | 12/1988 | Buck et al. | |
| 5,150,681 A * | 9/1992 | Kull et al. | 123/399 |
| 7,771,312 B2 * | 8/2010 | Sigmund | 477/107 |
| 8,425,380 B2 * | 4/2013 | Yamazaki | 477/204 |
| 8,554,419 B2 * | 10/2013 | Crombez et al. | 701/48 |
| 8,589,047 B2 * | 11/2013 | Mueller | 701/70 |
| 2008/0228369 A1 * | 9/2008 | Stroh et al. | 701/84 |
| 2008/0288150 A1 * | 11/2008 | Isogai et al. | 701/70 |
| 2010/0036566 A1 | 2/2010 | Hayami | |
| 2011/0295480 A1 * | 12/2011 | Shimada et al. | 701/70 |
| 2012/0116650 A1 * | 5/2012 | Miyazaki et al. | 701/102 |
| 2012/0295762 A1 * | 11/2012 | Koike | 477/185 |

FOREIGN PATENT DOCUMENTS

| | | | |
|---|---|---|---|
| JP | 62-051737 A | | 12/1988 |
| JP | 02070536 A | | 3/1990 |
| JP | 2005291030 A | * | 10/2005 |
| JP | 2010-038051 A | | 2/2010 |

* cited by examiner

*Primary Examiner* — Roger Pang
(74) *Attorney, Agent, or Firm* — Gifford, Krass, Sprinkle, Anderson & Citkowski, P.C.

(57) ABSTRACT

A vehicle control apparatus includes a controller that performs control such that an engine output does not increase when a control mechanism and a brake override are operated simultaneously, wherein the control mechanism controls the engine output independently of an accelerator operation amount, and wherein the brake override system reduces the engine output in response to simultaneous operations of an accelerator and a brake.

11 Claims, 4 Drawing Sheets

VEHICLE CONTROL APPARATUS

CROSS REFERENCE TO THE RELATED APPLICATIONS

This application claims priority to Japanese Patent Application No. 2011-135395 filed on Jun. 17, 2011, which is incorporated herein by reference in its entirety including the specification, drawings, and abstract.

BACKGROUND OF THE INVENTION

1. Field of the Invention

The invention relates to a vehicle control apparatus for a vehicle employing a brake override system (BOS) that reduces an engine output in response to simultaneous operations of an accelerator and a brake.

2. Description of Related Art

A BOS such as that described in Japanese Patent Application Publication No. 2010-038051 (JP 2010-038051 A), for example, is available as a control mechanism employed in a vehicle. A BOS is a control mechanism that prioritizes a brake function when an accelerator and a brake are operated simultaneously. In response to simultaneous operations of the accelerator and the brake, the BOS reduces an engine output, and as a result, a braking force generated by the brake exceeds a driving force generated by an engine.

A Traction Control (TRC) system, meanwhile, is available as a control mechanism that performs engine output control independently of an accelerator operation amount. A TRC system reduces the engine output when traction is lost in vehicle wheels in order to prevent tire slip during startup and acceleration.

In a vehicle employing both the BOS and the TRC system described above, the BOS may be activated in response to simultaneous operations of the accelerator and the brake in a condition where the engine output has been suppressed by the TRC system. FIG. 6 shows a condition occurring at this time. In FIG. 6, a BOS required value is a required value of a control accelerator operation amount required by the BOS, and a TRC required value is a required value of an accelerator operation amount value required by the TRC system. A smallest value among an actual accelerator operation amount, the BOS required value, and the TRC required value is set as the control accelerator operation amount used to calculate a throttle opening required value.

In FIG. 6, the brake is operated at a time T1 during travel in a condition where the engine output is suppressed by the TRC system, and as a result, the BOS is activated. When the BOS is activated, the BOS required value is reduced gradually from the actual accelerator operation amount. When the brake is operated, on the other hand, the traction of the vehicle wheels improves, and therefore the TRC required value increases gradually from the time T1. In FIG. 6, the TRC required value is lower than the BOS required value from the time T1 to a time T2, and therefore the control accelerator operation amount used to determine the throttle opening temporarily increases immediately after the time T1 at which the brake is operated.

Hence, in a vehicle employing both a BOS and a TRC system, the engine output may increase temporarily even though the BOS is operative. In this case, the engine output increases even though a driver assumes that the engine output is being suppressed by the BOS, and as a result, the driver may have a feeling of strangeness.

Note that when a control mechanism other than a TRC system which also performs engine output control independently of the accelerator operation amount is employed, the engine output may likewise increase temporarily, while the BOS is operative, in response to a request from the control mechanism.

SUMMARY OF THE INVENTION

The invention provides a vehicle control apparatus with which the drivability of a vehicle employing a BOS can be improved.

A first aspect of the invention is a vehicle control apparatus including a controller that performs control such that an engine output does not increase when a control mechanism and a brake over ride system are operated simultaneously, wherein the control mechanism controls the engine output independently of an accelerator operation amount, and wherein the brake override system reduces the engine output in response to simultaneous operations of an accelerator and a brake.

A second aspect of the invention is a vehicle control apparatus including a controller that prohibits a control mechanism that controls an engine output independently of an accelerator operation amount from increasing the engine output when the control mechanism is operated simultaneously with a brake over ride system that reduces the engine output in response to simultaneous operations of an accelerator and a brake.

According to both of the above configurations, when the BOS is activated in response to simultaneous operations of the accelerator and the brake, the engine output is not increased even if the control mechanism requests an increase in the engine output. Therefore, a situation in which the engine output is increased even though the BOS is operative, causing the driver a feeling of strangeness, is suppressed. Hence, according to the two configurations described above, the drivability of a vehicle employing a BOS can be improved.

The control mechanism may be a TRC system that reduces the engine output in response to a loss of traction in a vehicle wheel.

According to the above configuration, when the BOS is activated in response to simultaneous operations of the accelerator and the brake, the engine output is not increased even if the TRC system requests an increase in the engine output. Therefore, a situation in which the engine output is increased even though the BOS is operative, causing the driver a feeling of strangeness, is suppressed. Hence, according to the configuration described above, the drivability of a vehicle employing a BOS can be improved.

A third aspect of the invention is a vehicle control apparatus including a controller that does not permit, during simultaneous operations of an accelerator and a brake, an engine output to be increased through control other than that of a brake override system that reduces the engine output in response to simultaneous operations of the accelerator and the brake.

According to the above configuration, an increase in the engine output through control other than that of the BOS is prohibited while the BOS is operative. Therefore, a situation in which the engine output is increased even though the BOS is operative, causing the driver a feeling of strangeness, is suppressed. Hence, according to the configuration described above, the drivability of a vehicle employing a BOS can be improved.

When a throttle opening of the vehicle is set on the basis of a control accelerator operation amount, the controller may set the control accelerator operation amount at a value not larger than an accelerator operation amount corresponding to a current throttle opening during the simultaneous operations of the accelerator and the brake. Further, when a throttle valve of an engine is controlled on the basis of a throttle opening required value, the controller may set the throttle opening required value at a value not larger than a current throttle opening during the simultaneous operations of the accelerator and the brake.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 2:
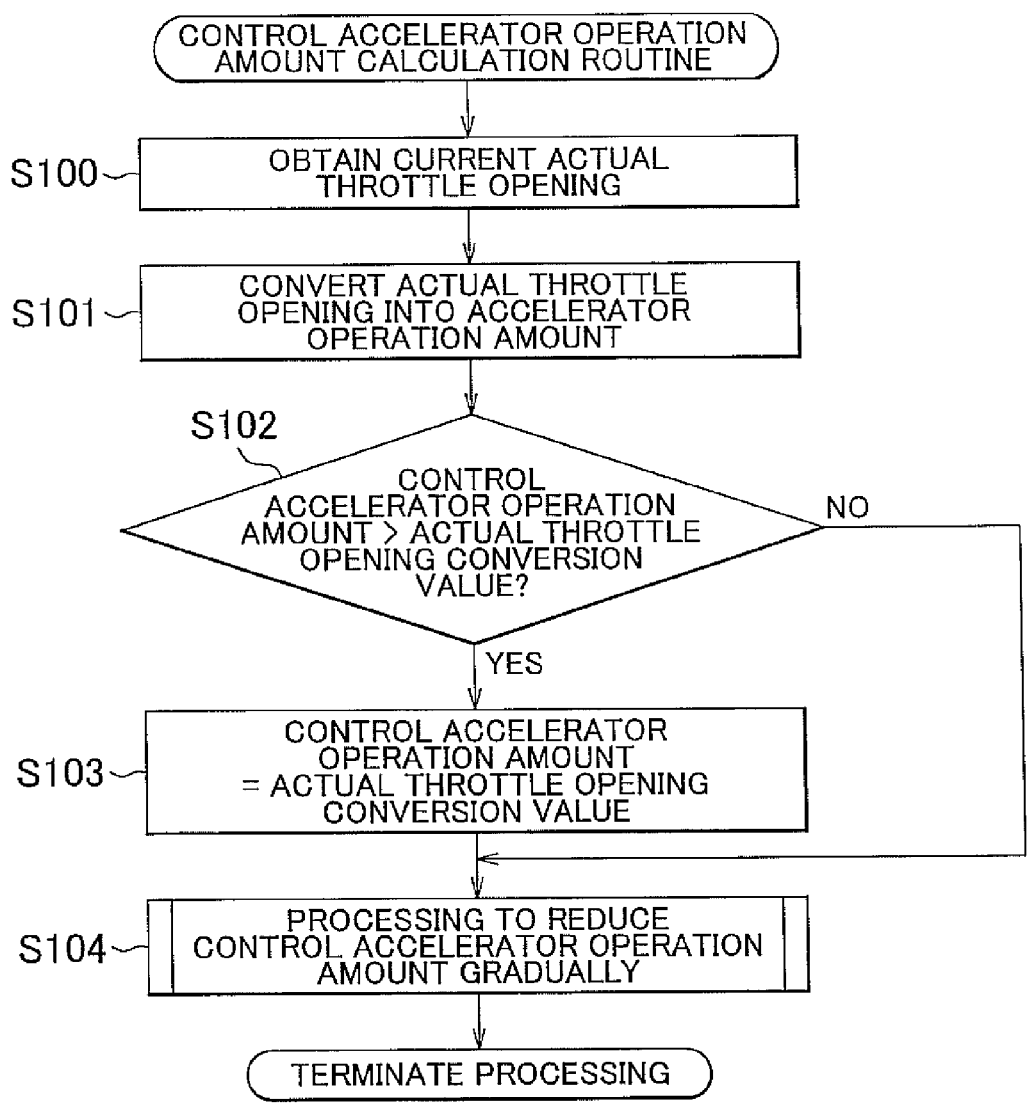
FIG. 2 is a flowchart showing processing procedures of a control accelerator operation amount calculation routine employed in the first embodiment.
Figure 3:
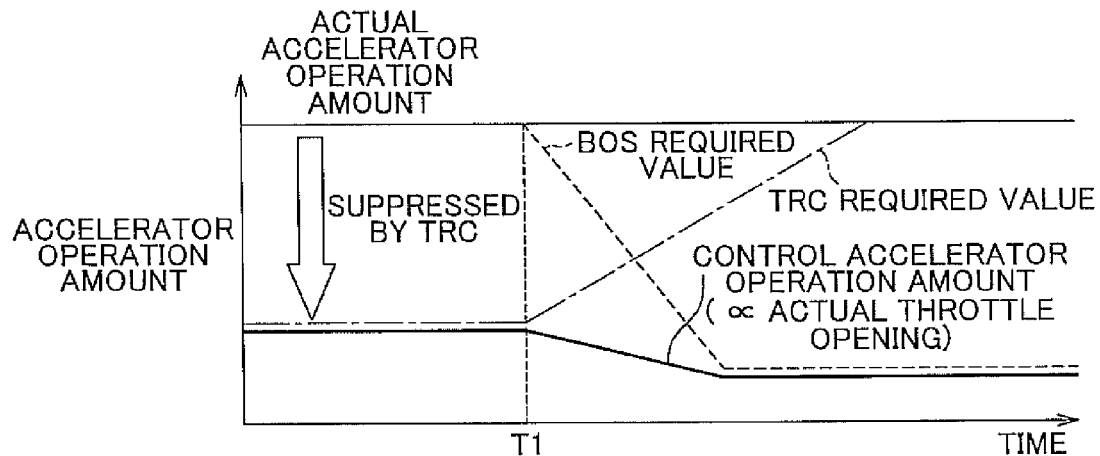
FIG. 3 is a time chart showing an example of control performed when a TRC system and a BOS are operated simultaneously in the first embodiment.

DETAILED DESCRIPTION OF EMBODIMENTS (First Embodiment)
A first specific embodiment of a vehicle control apparatus according to the invention will be described in detail below with reference to FIGS. 1 to 3.

Figure 1:
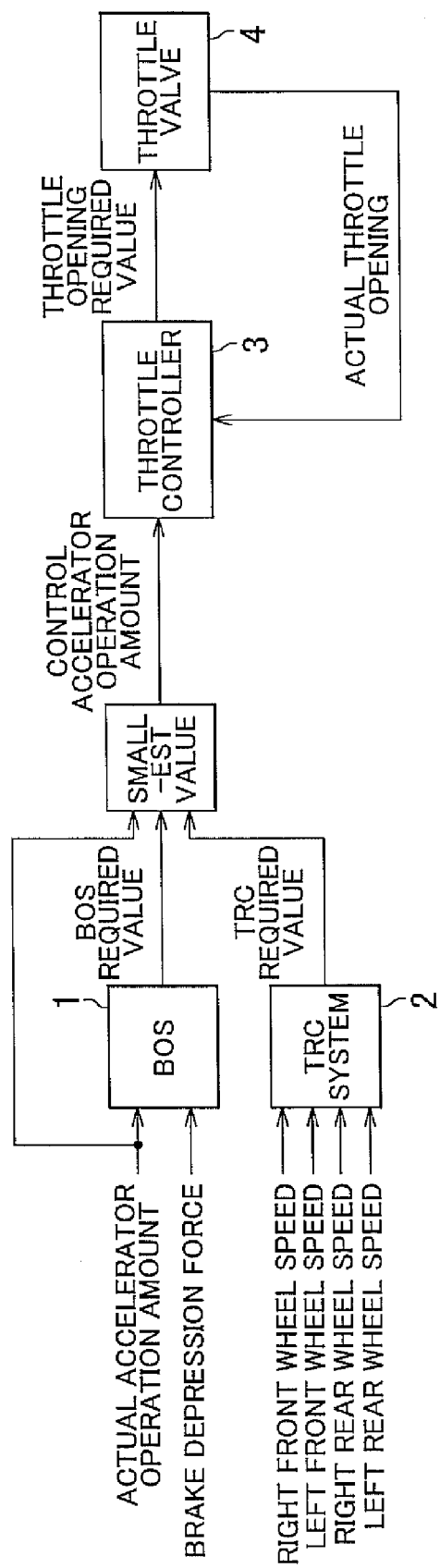
FIG. 1 is a schematic diagram showing an overall configuration of a vehicle control apparatus according to a first embodiment of the invention.

As shown in FIG. 1, the vehicle control apparatus according to this embodiment includes two control mechanisms, namely a BOS 1 and a TRC system 2. The BOS 1 detects simultaneous operations of an accelerator and a brake on the basis of a detection value of an accelerator operation amount (an actual accelerator operation amount) and a detection value of a brake depression force, calculates a required value (a BOS required value) of a control accelerator operation amount in accordance with the detection results so as to reduce an engine output, and outputs the calculated BOS required value. The TRC system 2 detects a loss of traction (tire slip) in four vehicle wheels of the vehicle on the basis of respective wheel speeds of the vehicle wheels, calculates a required value (a TRC required value) of the control accelerator operation amount in accordance with the detection results so as to reduce the engine output, and outputs the calculated required TRC value.

A control throttle opening is input into a throttle controller 3. The control throttle opening is set at a smallest value among the actual accelerator operation amount, the BOS required value, and the TRC required value. The throttle controller 3 calculates a throttle opening required value on the basis of the control accelerator operation amount, and controls a throttle valve 4 of the engine such that the actual throttle opening reaches the throttle opening required value. A detection value of an opening of the throttle valve 4 (an actual throttle opening) is input into the throttle controller 3.

In the vehicle control apparatus according to this embodiment, when the accelerator and the brake are operated simultaneously while the TRC system 2 is operative, or in other words while the engine output is reduced in accordance with the loss of traction in the vehicle wheels and the BOS 1 is activated, the throttle controller 3 executes control such that drivability does not deteriorate as a result of the simultaneous operations of the two control mechanisms. This control is executed through the processing of a control accelerator operation amount calculation routine shown in FIG. 2. The processing of the control accelerator operation amount calculation routine is executed repeatedly by the throttle controller 3 at prescribed control period intervals when the BOS 1 and the TRC system 2 are operated simultaneously.

When the processing of this routine begins, first, in Step S100, a current actual throttle opening is obtained. Next, in Step S101, the obtained actual throttle opening is converted into a corresponding accelerator operation amount. This conversion is performed on the basis of a relational expression between the accelerator operation amount and the throttle opening. The relational expression between the accelerator operation amount and the throttle opening is identical to a relational expression used normally in a case where the throttle opening is set in conjunction with the accelerator operation amount. A resulting conversion value will be described below as an "actual throttle opening conversion value".

Next, in Step S102, the control accelerator operation amount set at the smallest value among the actual accelerator operation amount, the BOS required value, and the TRC required value is compared with the actual throttle opening conversion value determined in S101. When the control accelerator operation amount is not larger than the actual throttle opening conversion value (S102: NO), the routine advances as is to processing of Step S104. When, on the other hand, the control accelerator operation amount exceeds the actual throttle opening conversion value (S102: YES), the actual throttle opening conversion value is reset at a value of the control accelerator operation amount in Step S103, whereupon the routine advances to the processing of Step S104.

When the routine advances to the processing of Step S104, processing for reducing the control accelerator operation amount is performed in Step S104. In this reduction processing, the value of the control accelerator operation amount is reduced gradually over time from the start of the simultaneous operations of the accelerator and the brake until the control accelerator operation amount required by the BOS 1 reaches a final target value.

Next, functions of this embodiment will be described with reference to FIG. 3. In FIG. 3, the accelerator and the brake are operated simultaneously at a time T1 during travel in a condition where the engine output is suppressed by the TRC system 2, and as a result, the BOS 1 is activated. When the BOS 1 is activated, the BOS required value of the control accelerator operation amount is reduced gradually from the value of the actual accelerator operation amount at the time T1. When the brake is operated, on the other hand, the traction of the vehicle wheels improves, and therefore the TRC required value of the control accelerator operation amount is gradually increased.

The TRC required value is smaller than the BOS required value immediately after the time T1, and therefore the control accelerator operation amount set at the smallest value among the actual accelerator operation amount, the BOS required value, and the TRC required value would conventionally increase temporarily as the TRC required value increases. According to this embodiment, however, when the control accelerator operation amount exceeds the actual throttle opening conversion value during simultaneous operations of the BOS 1 and the TRC system 2, the value of the control accelerator operation amount is reset at the value of the actual throttle opening conversion value. Therefore, the control accelerator operation amount is reduced gradually by the reduction processing from the time T1 rather than being increased. Hence, according to this embodiment, the actual throttle opening, and therefore the engine output, does not increase following activation of the BOS 1, regardless of the control condition of the TRC system 2.

With the vehicle control apparatus according to this embodiment, following effects can be obtained. In this embodiment, the engine output does not increase when the TRC system 2 and the BOS 1 are operated simultaneously. In other words, according to this embodiment, the TRC system 2 is prohibited from increasing the engine output during simultaneous operations of the TRC system 2 and the BOS 1. As a result, a situation in which the engine output is increased even though the BOS 1 is operative, causing the driver a feeling of strangeness, is suppressed. According to this embodiment, therefore, the drivability of a vehicle employing the BOS 1 can be improved.

(Second Embodiment)

Next, a second specific embodiment of the vehicle control apparatus according to the invention will be described in detail with additional reference to FIGS. 4 and 5. Note that in this embodiment, shared configurations with the above embodiment have been allocated identical reference numerals, and detailed description thereof has been omitted.

Figure 4:
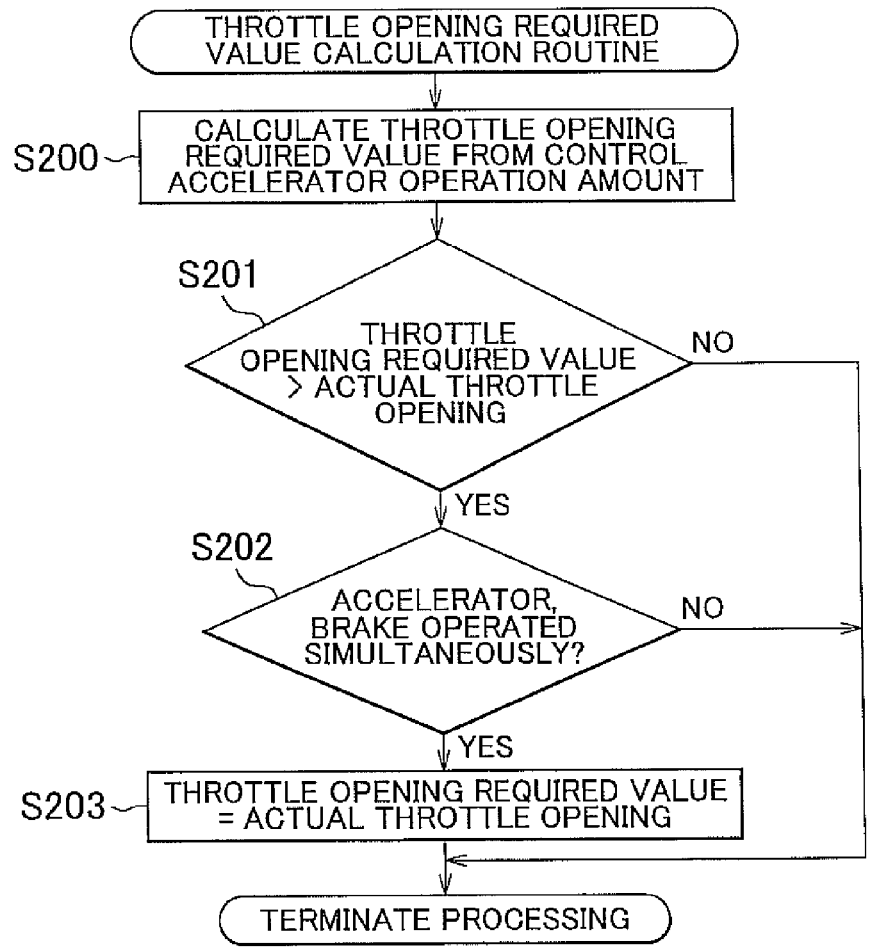
FIG. 4 is a flowchart showing processing procedures of a throttle opening required value calculation routine employed in a second embodiment of the invention.

In this embodiment, the control for suppressing the temporary increase in the engine output that occurs during simultaneous operations of the TRC system 2 and the BOS 1 is performed through processing of a throttle opening required value calculation routine shown in FIG. 4. The processing of this routine is executed repeatedly by the throttle controller 3 at prescribed control period intervals.

When this routine begins, first, in Step S200, a throttle opening required value is calculated on the basis of the control accelerator operation amount. As described above, the smallest value among the actual accelerator operation amount, the BOS required value, and the TRC required value is set as the value of the control accelerator operation amount.

Next, in Step S201, the throttle opening required value is compared with the actual throttle opening. When the throttle opening required value is not larger than the actual throttle opening (S201: NO), the processing of the current routine is terminated. In this case, the value calculated on the basis of the control accelerator operation amount is set as is as the throttle opening required value.

When the throttle opening required value exceeds the actual throttle opening (S201: YES), on the other hand, a determination is made in Step S202 as to whether or not the accelerator and the brake have been operated simultaneously. When the accelerator and the brake have not been operated simultaneously, the processing of the current routine is terminated. Likewise in this case, the value calculated on the basis of the control accelerator operation amount is set as is as the throttle opening required value.

When the accelerator and the brake have been operated simultaneously (S202: YES), on the other hand, the value of the throttle opening required value is reset at the actual throttle opening in Step S203, whereupon the processing of the current routine is terminated. In other words, according to this embodiment, when the accelerator and the brake are operated simultaneously such that the BOS 1 is activated, the throttle opening required value is set so as not to exceed the current throttle opening.

Next, functions of this embodiment will be described with reference to FIG. 5. Note that the actual throttle opening conversion value in FIG. 5 is a value obtained by converting the actual throttle opening to a corresponding accelerator operation amount on the basis of the relational expression between the accelerator operation amount and the throttle opening used normally in a case where the throttle opening is set in conjunction with the accelerator operation amount.

Figure 5:
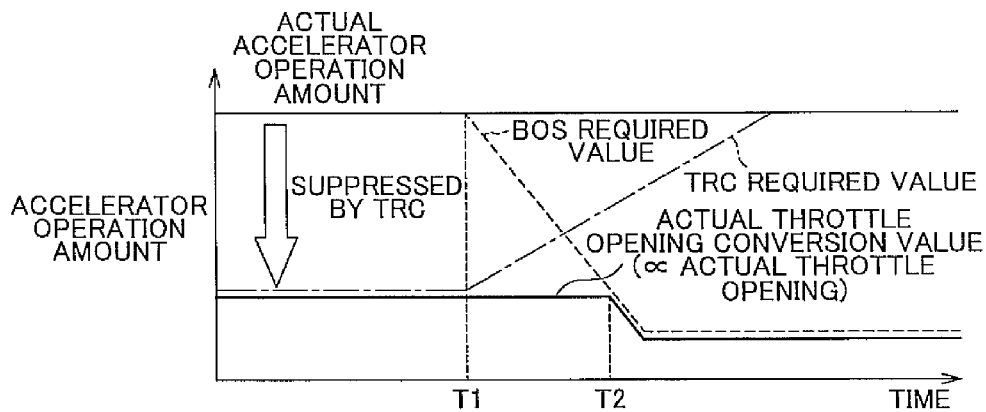
FIG. 5 is a time chart showing an example of control performed when the TRC system and the BOS are operated simultaneously in the second embodiment.
Figure 6:
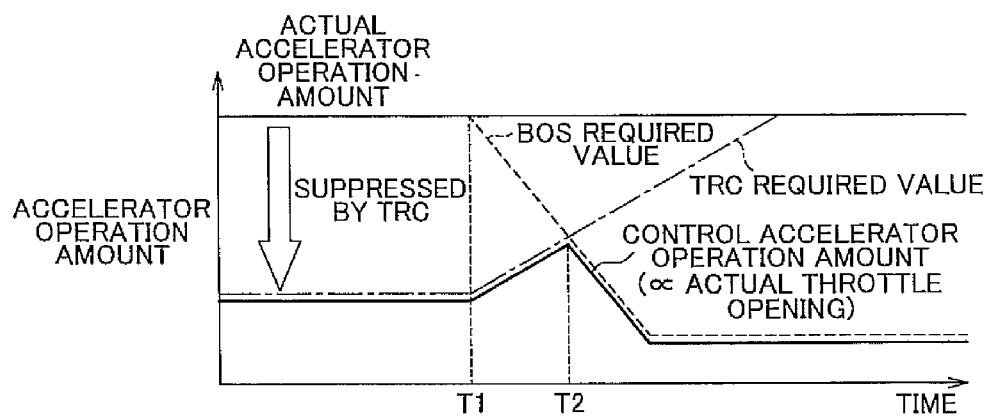
FIG. 6 is a time chart showing control performed when a TRC system and a BOS are operated simultaneously in a conventional vehicle control apparatus.

In FIG. 5, the accelerator and the brake are operated simultaneously at a time T1 during travel in a condition where the engine output is suppressed by the TRC system 2, and as a result, the BOS 1 is activated. When the BOS 1 is activated, the BOS required value of the control accelerator operation amount is reduced gradually from the value of the actual accelerator operation amount at the time T1. When the brake is operated, on the other hand, the traction of the vehicle wheels improves, and therefore the TRC required value of the control accelerator operation amount is increased gradually.

The TRC required value is smaller than the BOS required value immediately after the time T1, and therefore the control accelerator operation amount set at the smallest value among the actual accelerator operation amount, the BOS required value, and the TRC required value increases temporarily as the TRC required value increases. According to this embodiment, however, it is prohibited to set the throttle opening required value at a value exceeding the actual throttle opening during simultaneous operations of the accelerator and the brake. Therefore, the actual throttle opening conversion value, or in other words the actual throttle opening, is maintained at a fixed value regardless of an increase in the control accelerator operation amount corresponding to an increase in the TRC required value. The actual throttle opening is maintained at the fixed value until a time T2, at which the control accelerator operation amount decreases to a value at the start of the operation of the BOS 1, and thereafter, the actual throttle opening is reduced in accordance with reductions in the control accelerator operation amount.

With the vehicle control apparatus according to the embodiment described above, similar effects to the first embodiment can be obtained. Note that modifications such as the following can be implemented on the embodiments described above.

In the above embodiments, an increase in the engine output during an operation of the BOS 1 is suppressed by restricting an increase in the control accelerator operation amount or the throttle opening required value while the BOS 1 is operative. However, an increase in the engine output during an operation of the BOS 1 may be suppressed by controlling a control parameter other than the control accelerator operation amount and the throttle opening required value.

In the above embodiments, an increase in the engine output is suppressed during simultaneous operations of the TRC system 2 and the BOS 1. However, when a control mechanism other than the TRC system 2 which also performs engine output control independently of the accelerator operation amount is employed together with the BOS 1, the engine output may likewise increase temporarily during an operation of the BOS 1 in response to a request from the control mechanism. In this case also, an increase in the engine output during the operation of the BOS 1 can be suppressed by prohibiting an increase in the engine output in response to a request from the control mechanism while the BOS 1 is operative, and as a result, an improvement in drivability can be achieved.

What is claimed is:

1. A vehicle control apparatus comprising:
a controller that performs control such that an engine output does not increase when a control mechanism and a brake override system are operated simultaneously, wherein the control mechanism controls the engine output independently of an accelerator operation amount, and wherein the brake override system reduces the engine output in response to simultaneous operations of an accelerator and a brake.

2. The vehicle control apparatus according to claim 1, wherein
the control mechanism is a traction control system that reduces the engine output in response to a loss of traction in a vehicle wheel.

3. The vehicle control apparatus according to claim 1, wherein:
a throttle opening of a vehicle is set on the basis of a control accelerator operation amount; and
during the simultaneous operations of the accelerator and the brake, the controller sets the control accelerator operation amount at a value not larger than an accelerator operation amount corresponding to a current throttle opening.

4. The vehicle control apparatus according to claim 1, wherein:
a throttle valve of an engine is controlled on the basis of a throttle opening required value; and
during the simultaneous operations of the accelerator and the brake, the controller sets the throttle opening required value at a value not larger than a current throttle opening.

5. A vehicle control apparatus comprising:
a controller that prohibits a control mechanism that controls an engine output independently of an accelerator operation amount from increasing the engine output when the control mechanism is operated simultaneously with a brake override system that reduces the engine output in response to simultaneous operations of an accelerator and a brake.

6. The vehicle control apparatus according to claim 5, wherein
the control mechanism is a traction control system that reduces the engine output in response to a loss of traction in a vehicle wheel.

7. The vehicle control apparatus according to claim 5, wherein:
a throttle opening of a vehicle is set on the basis of a control accelerator operation amount; and
during the simultaneous operations of the accelerator and the brake, the controller sets the control accelerator operation amount at a value not larger than an accelerator operation amount corresponding to a current throttle opening.

8. The vehicle control apparatus according to claim 5, wherein:
a throttle valve of an engine is controlled on the basis of a throttle opening required value; and
during the simultaneous operations of the accelerator and the brake, the controller sets the throttle opening required value at a value not larger than a current throttle opening.

9. A vehicle control apparatus comprising:
a controller that does not permit, during simultaneous operations of an accelerator and a brake, an engine output to be increased when a traction control system, that prevents wheel slip, requires the engine output to be increased, and reduces the engine output in response to simultaneous operations of the accelerator and the brake.

10. The vehicle control apparatus according to claim 9, wherein:
a throttle opening of a vehicle is set on the basis of a control accelerator operation amount; and
during the simultaneous operations of the accelerator and the brake, the controller sets the control accelerator operation amount at a value not larger than an accelerator operation amount corresponding to a current throttle opening.

11. The vehicle control apparatus according to claim 9, wherein:
a throttle valve of an engine is controlled on the basis of a throttle opening required value; and
during the simultaneous operations of the accelerator and the brake, the controller sets the throttle opening required value at a value not larger than a current throttle opening.

* * * * *